(12) United States Patent
Liu et al.

(10) Patent No.: US 9,904,283 B2
(45) Date of Patent: Feb. 27, 2018

(54) SYSTEMS AND METHODS EMPLOYING CODED LIGHT TO DOCK AERIAL DRONES, SELF-DRIVING CARS AND SURFACE ROBOTS

(71) Applicant: FUJI XEROX CO., LTD., Tokyo (JP)

(72) Inventors: Qiong Liu, Cupertino, CA (US); Shang Ma, Irvine, CA (US); Sven Kratz, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/064,595

(22) Filed: Mar. 8, 2016

(65) Prior Publication Data

US 2017/0261975 A1    Sep. 14, 2017

(51) Int. Cl.
  *G05D 1/02*    (2006.01)
  *H04B 10/116*    (2013.01)
  (Continued)

(52) U.S. Cl.
  CPC .......... *G05D 1/0011* (2013.01); *B64C 39/024* (2013.01); *B64F 1/18* (2013.01);
  (Continued)

(58) Field of Classification Search
  CPC .. G05D 1/0225; G05D 1/0231; G05D 1/0234; G05D 1/0242; G05D 1/0202;
  (Continued)

(56) References Cited

U.S. PATENT DOCUMENTS 4,488,233 A * 12/1984 Tsumura .................. G01S 1/70
                                                        172/4.5
4,706,120 A * 11/1987 Slaughter ............... G05D 1/028
                                                        180/168
(Continued)

FOREIGN PATENT DOCUMENTS

DE    102007036229 A1 *  2/2009  .......... G05D 1/0225
JP        63298411 A  * 12/1988
(Continued)

OTHER PUBLICATIONS

JPO machine translation of JP 2003-104295 (original JP document published Apr. 9, 2003).*

(Continued)

*Primary Examiner* — Behrang Badii
*Assistant Examiner* — David A Testardi
(74) *Attorney, Agent, or Firm* — TransPacific Law Group; Pavel I. Pogodin, Esq.

(57) ABSTRACT

Precision docking is one of the most important tasks for drones and surface robots to charge themselves and load/unload packages. Without accurate docking, surface robots and drones will miss their charging pad or charging contacts and cannot automatically charge themselves for later tasks. Described is a system using coded light to guide the precision docking process for drones and ground robots. More specifically, the system uses projectors to project temporal identifiers for space partitioned by pixel projections. Different space partition gets a different identifier. By using a simple light sensor on a drone or a ground robot, the drone (Continued)

or the ground robot can know its precise location in the space and therefore knows where to move for a precise docking. Depending on docking precision requirement, the coded light precision may be adjusted by using projectors with different resolutions.

21 Claims, 9 Drawing Sheets

(51) Int. Cl.
  *G05D 1/00* (2006.01)
  *B64C 39/02* (2006.01)
  *G05D 1/10* (2006.01)
  *B64F 1/18* (2006.01)
(52) U.S. Cl.
  CPC ......... *G05D 1/0225* (2013.01); *G05D 1/0231* (2013.01); *G05D 1/0276* (2013.01); *G05D 1/101* (2013.01); *H04B 10/116* (2013.01)
(58) Field of Classification Search
  CPC .. G05D 1/0276; G05D 1/0246; G05D 1/0011; G05D 1/101; A47L 9/2873; A47L 2201/022; H04B 10/116
  See application file for complete search history.

(56) References Cited

U.S. PATENT DOCUMENTS

| | | | | |
|---|---|---|---|---|
| 4,773,018 | A * | 9/1988 | Lundstrom | G05D 1/0246 180/168 |
| H0628 | H * | 4/1989 | McIngvale | G01S 13/913 342/120 |
| 4,940,925 | A * | 7/1990 | Wand | G05D 1/0246 318/580 |
| 5,220,263 | A * | 6/1993 | Onishi | G05B 19/41895 180/168 |
| 6,193,190 | B1 * | 2/2001 | Nance | B64F 1/007 244/114 R |
| 6,957,132 | B1 * | 10/2005 | Richburg | G05D 1/0225 362/543 |
| 7,010,401 | B1 * | 3/2006 | Richburg | G05D 1/0225 180/167 |
| 7,397,213 | B2 | 7/2008 | Im et al. | |
| 7,489,985 | B2 | 2/2009 | Ko et al. | |
| 7,706,917 | B1 * | 4/2010 | Chiappetta | G05D 1/0225 700/245 |
| 7,729,803 | B2 | 6/2010 | Lim et al. | |
| 8,047,149 | B1 * | 11/2011 | Antonelli | G01S 1/70 114/230.1 |
| 8,244,403 | B2 * | 8/2012 | Lin | G05D 1/0246 180/168 |
| 8,918,241 | B2 * | 12/2014 | Chen | G05D 1/0219 318/568.12 |
| 9,083,461 | B2 * | 7/2015 | Chin | G01S 1/70 |
| 2002/0027652 | A1 * | 3/2002 | Paromtchik | G05D 1/0297 356/141.1 |
| 2002/0165648 | A1 * | 11/2002 | Zeitler | G05D 1/0261 701/23 |
| 2004/0090206 | A1 * | 5/2004 | Choi | A63H 18/12 320/107 |
| 2005/0156562 | A1 | 7/2005 | Cohen et al. | |
| 2005/0221840 | A1 * | 10/2005 | Yamamoto | G05D 1/0242 455/456.3 |
| 2006/0074532 | A1 * | 4/2006 | Hong | G05D 1/0231 701/28 |
| 2007/0102627 | A1 * | 5/2007 | Sano | G01S 1/70 250/221 |
| 2008/0012518 | A1 * | 1/2008 | Yamamoto | G05D 1/0225 318/568.12 |
| 2008/0091304 | A1 * | 4/2008 | Ozick | A47L 5/30 700/258 |
| 2010/0010672 | A1 | 1/2010 | Wang et al. | |
| 2010/0082193 | A1 * | 4/2010 | Chiappetta | G05D 1/0225 701/24 |
| 2010/0299016 | A1 * | 11/2010 | Benzler | G05D 1/0246 701/26 |
| 2010/0305752 | A1 * | 12/2010 | Abramson | G01S 1/70 700/245 |
| 2011/0046780 | A1 * | 2/2011 | Anderson | G05D 1/0274 700/248 |
| 2012/0158282 | A1 * | 6/2012 | Park | G05D 1/0274 701/409 |
| 2012/0323365 | A1 * | 12/2012 | Taylor | B25J 19/005 700/259 |
| 2013/0297197 | A1 * | 11/2013 | Zhai | B60W 30/12 701/408 |
| 2013/0332008 | A1 * | 12/2013 | Herman | B64C 39/024 701/2 |
| 2014/0058556 | A1 * | 2/2014 | Kawano | G05D 1/0234 700/216 |
| 2016/0227634 | A1 * | 8/2016 | Engelen | H05B 37/0245 |

FOREIGN PATENT DOCUMENTS

| | | | | |
|---|---|---|---|---|
| JP | 2003104295 | A * | 4/2003 | |
| JP | 2008225837 | A * | 9/2008 | |
| WO | WO 2010064989 | A1 * | 6/2010 | G01S 5/30 |

OTHER PUBLICATIONS

JPO machine translation of JP 2008-225837 (original JP document published Sep. 25, 2008).*
Fan et al., "Smart toy car localization and navigation using projected light", 2015 IEEE International Symposium on Multimedia, ISM 2015, Dec. 14, 2015, Miami, Florida, pp. 399 to 402.*
M. C. Silverman, Staying Alive Longer: Autonomous Robot Recharging Put to the Test, U. of So. Cal. Center for Robotics and Embedded Systems Technical Report CRES-03-015, 2003.
Takefumi Hiraki, Issei Takahashi, Shotaro Goto, Shogo Fukushima and Takeshi Naemura, "Phygital Field: Integrated Field with Visible Images and Robot Swarm Controlled by Invisible Images," Proceedings, SIGGRAPH '15 ACM SIGGRAPH 2015 Posters, Article No. 85, Los Angeles, California—Aug. 9-13, 2015.

* cited by examiner

SYSTEMS AND METHODS EMPLOYING CODED LIGHT TO DOCK AERIAL DRONES, SELF-DRIVING CARS AND SURFACE ROBOTS

BACKGROUND OF THE INVENTION

Technical Field

The disclosed embodiments relate in general to systems and methods for positioning and navigation and, more specifically, to systems and methods employing coded lighting to dock autonomous vehicles, such as aerial drones, self-driving cars and surface robots.

Description of the Related Art

Precision docking is one of the most important tasks for aerial drones and surface robots to charge themselves and load/unload packages. Without accurate docking, surface robots and aerial drones will miss their charging pad or charging contacts and cannot automatically charge themselves for later tasks. Conventional docking techniques include vision (color) based systems described, for example, in Milo C. Silverman, Boyoon Jung, Dan Nies and Gaurav S. Sukhatme, Staying Alive Longer: Autonomous Robot Recharging Put to the Test, University of Southern California Center for Robotics and Embedded Systems (CRES) Technical Report CRES-03-015, 2003 and Yulun Wang, Goleta, Calif. (US); Charles S. Jordan, Santa Barbara, Calif. (US); Marco Pinter, Santa Barbara, Calif. (US); Daniel Steven Sanchez, Summerland, Calif. (US); James Rosenthal, Santa Barbara, Calif. (US); Amante Mangaser, Goleta, Calif. (US), DOCKING SYSTEM FOR A TELE-PRESENCE ROBOT, US 2010/0010672 A1, Jan. 14, 2010. The shortcomings of such systems include their reliance on environmental brightness and relatively slow speed of location determination.

Other conventional docking techniques rely on mechanical parts, which, as would be appreciated by persons of ordinary skill in the art, introduce a point of likely mechanical failure. Yet other systems utilize complicated region relations for an inaccurate direction guidance, as described, for example, in KWang-soo Lim, Seoul (KR); Sam-jong Jeung, GWangju (KR); Jeong-gon Song, GWangju (KR); Ju-sang Lee, GWangju (KR); Jang-youn Ko, GWangju (KR), SYSTEM AND METHOD FOR RETURNING ROBOT CLEANER TO CHARGER, U.S. Pat. No. 7,729,803 B2, Jun. 1, 2010, Jang-Youn Ko, GWangju (KR); Sam-Jong Jeung, GWanju (KR); Jeong-Gon Song, GWangju (KR); Ki-Man Kim, GWangju (KR); Ju-Sang Lee, GWangju (KR); KWang-Soo Lim, Gemcheon-Gu (KR), ROBOT CLEANER SYSTEM AND A METHOD FOR RETURNING TO EXTERNAL RECHARGING APPARATUS, U.S. Pat. No. 7,489,985 B2, Feb. 10, 2009 and Hyoung-deuk Im, Seoul (KR); Jong-il Park, Gupo_si (KR), MOBILE ROBOT AND MOBILE ROBOT CHARGE STATION RETURN SYSTEM, U.S. Pat. No. 7,397,213 B2, Jul. 8, 2008. Yet additional systems described, for example, in David A. Cohen, Brookline, Mass. (US); Daniel Ozick, Newton' Mass. (Us); Clara Vu, Cambridge, Mass. (Us); James Lynch, Georgetown, Mass. (US); Philip R. Mass, Denver, Colo. (US), AUTONOMOUS ROBOT AUTO-DOCKING AND ENERGY MANAGEMENT SYSTEMS AND METHODS, require the robot to move to region with overlapped signals from left and right, resulting in unnecessary sideways movements of the robot before docking.

In view of the above and other shortcomings of the conventional technology, new and improved systems and methods for precision docking are needed that would enable aerial drones and surface robots to quickly and effectively find their docking stations.

SUMMARY OF THE INVENTION

The embodiments described herein are directed to systems and methods that substantially obviate one or more of the above and other problems associated with the conventional docking systems.

In accordance with one aspect of the embodiments described herein, there is provided an autonomous vehicle guidance system incorporating: a projector configured to project a temporal projector light signal, wherein the temporal projector light signal is encoded, for each pixel of the projector, with an information segment comprising the pixel coordinates of the each pixel of the projector; and an autonomous vehicle comprising a light sensor and an onboard computer operatively coupled to the light sensor, wherein the light sensor is configured to detect the temporal projector light signal and generate a sensor signal and wherein the onboard computer is configured to receive a sensor signal from the light sensor, to determine a location information of the autonomous vehicle based on the detected temporal projector light signal and to issue a guidance command based on the detected location of the autonomous vehicle.

In one or more embodiments, the onboard computer of the autonomous vehicle determines the location information of the autonomous vehicle by identifying a projector pixel corresponding to the sensor signal.

In one or more embodiments, the location information of the autonomous vehicle comprises angular position of the autonomous vehicle with respect to the projector.

In one or more embodiments, the autonomous vehicle comprises a second light sensor configured to detect the temporal projector light signal and generate a second sensor signal, wherein the onboard computer of the autonomous vehicle determines the location information of the autonomous vehicle by identifying a second projector pixel corresponding to the second sensor signal and wherein the location information further comprises a distance from the autonomous vehicle to the projector.

In one or more embodiments, the distance from the autonomous vehicle to the projector is determined additionally based on a distance between the light sensor and the second light sensor.

In one or more embodiments, the onboard computer of the autonomous vehicle is configured to cause the autonomous vehicle to slow down when the determined distance from the autonomous vehicle to the projector is less than a predetermined threshold.

In one or more embodiments, the autonomous vehicle comprises a second light sensor configured to detect the temporal projector light signal and generate a second sensor signal, wherein the onboard computer of the autonomous vehicle determines orientation information of the autonomous vehicle by identifying a projector pixel corresponding to the sensor signal and a second projector pixel corresponding to the second sensor signal and wherein the orientation information is determined based on the identified first projector pixel and the second projector pixel.

In one or more embodiments, the onboard computer of the autonomous vehicle is configured to issue a second command to cause the autonomous vehicle to achieve a predetermined orientation.

In one or more embodiments, the autonomous vehicle comprises a plurality of electrical contacts and wherein when the autonomous vehicle achieves the predetermined orientation, the plurality of electrical contacts of the autonomous vehicle mates with a second plurality of electrical contacts of a base to enable charging of the autonomous vehicle.

In one or more embodiments, the temporal projector light signal projected by the project comprises a plurality of sequential light pulses encoding pixel coordinates of the each pixel of the projector.

In one or more embodiments, the autonomous vehicle comprises a second light sensor configured to detect the temporal projector light signal and generate a second sensor signal and wherein the onboard computer is configured to issue the guidance command based on a difference between the sensor signal and the second sensor signal.

In one or more embodiments, the guidance command is issued based on proportional-integral-derivative (PID) calculation.

In one or more embodiments, the autonomous vehicle is an aerial drone, wherein the projector is positioned at a drone base, wherein the light sensor is positioned on the bottom side of the aerial drone and wherein the onboard computer issues the guidance command to guide the aerial drone to the drone base.

In one or more embodiments, the autonomous vehicle is a surface robot, wherein the projector is positioned above a surface robot charging station, wherein the light sensor is positioned on the top front side of the robot and wherein the onboard computer issues the guidance command to guide the surface robot to the charging station.

In one or more embodiments, the surface robot further comprises a second light sensor positioned on the top rear side of the robot.

In one or more embodiments, the charging station comprises a first set of electrical contacts and the surface robot comprises a second set of electrical contacts designed to mate with the first set of electrical contacts when the surface robot dock at the charging station.

In one or more embodiments, a central axis of the charging station coincides with a central axis of the projector.

In one or more embodiments, the autonomous vehicle is a self-driving car.

In accordance with another aspect of the embodiments described herein, there is provided a method for guiding an autonomous vehicle, the method involving: using a projector to project a temporal projector light signal, wherein the temporal projector light signal is encoded, for each pixel of the projector, with an information segment comprising the pixel coordinates of the each pixel of the projector; detecting the temporal projector light signal using a light sensor of an autonomous vehicle and generating corresponding sensor signal; and using an onboard computer of the autonomous vehicle to receive the sensor signal, to determine location of the autonomous vehicle based on the detected the temporal projector light signal and to issue a guidance command based on the detected location of the autonomous vehicle.

In accordance with yet another aspect of the embodiments described herein, there is provided a computer-readable medium embodying a set of instructions implementing a method for guiding an autonomous vehicle, the method involving: using a projector to project a temporal projector light signal, wherein the temporal projector light signal is encoded, for each pixel of the projector, with an information segment comprising the pixel coordinates of the each pixel of the projector; detecting the temporal projector light signal using a light sensor of an autonomous vehicle and generating corresponding sensor signal; and using an onboard computer of the autonomous vehicle to receive the sensor signal, to determine location of the autonomous vehicle based on the detected the temporal projector light signal and to issue a guidance command based on the detected location of the autonomous vehicle.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a system and method for precision docking of aerial drones and surface robots (collectively, "autonomous vehicles") using coded lighting. Specifically, in one or more embodiments, the system uses projectors to project temporal identifiers for space partitioned by pixel projections. Different space partition is associated with a different identifier. By using a simple light sensor on a drone or a ground robot, and decoding the sensed light signal, the aerial drone or the surface robot can determine its precise location in the space. This information may be used for a precise docking of the respective drone or robot. Depending on the docking precision requirements, the coded light precision may be adjusted by using projectors with different resolutions.

Figure 1:
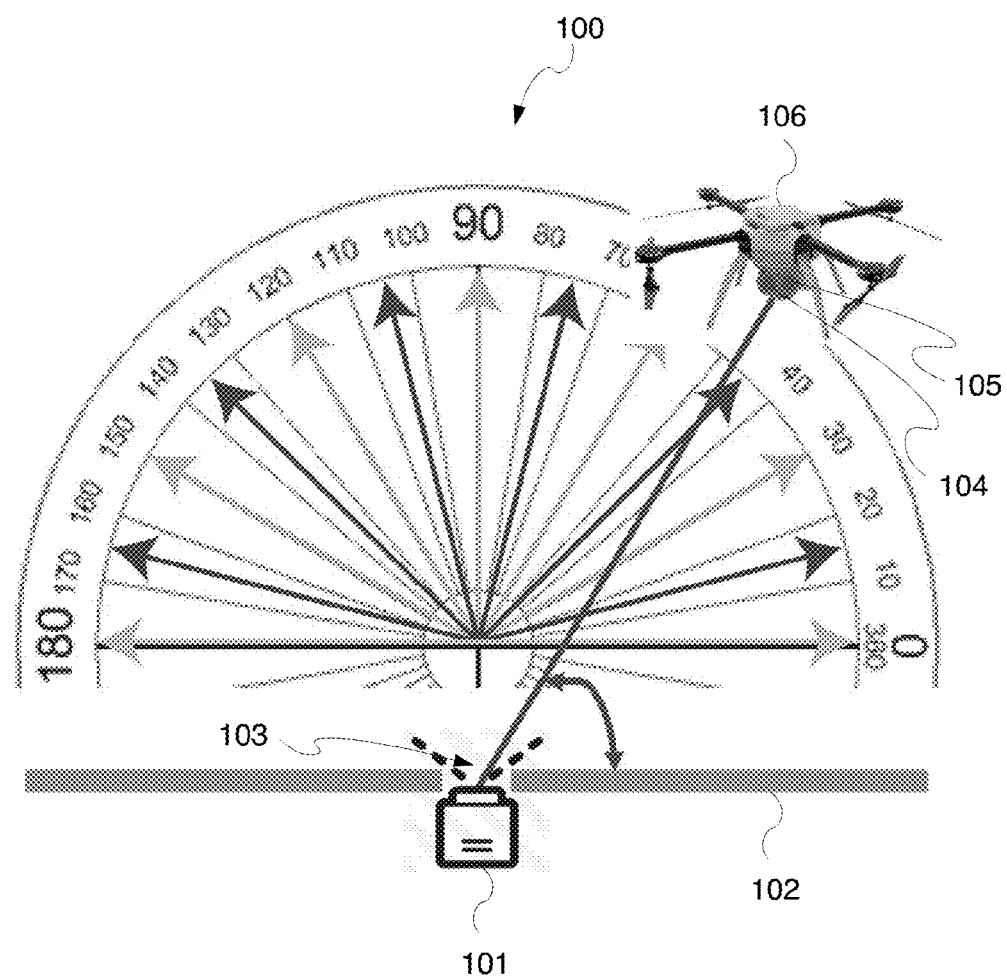
FIG. 1 illustrates an exemplary embodiment of a docking or landing guidance system for an aerial drone.

An exemplary embodiment of a docking or landing guidance system 100 for an aerial drone is illustrated in FIG. 1. In the system 100, a light source (projector 101) is installed under the parking floor 102 and is configured to project a light through a hole 103 in the parking floor 102. On one or more embodiments, the hole 103 may be located at or substantially close to a base (not shown) of the drone, car or robot.

As would be appreciated by persons of ordinary skill in the art, in this way, the entire space (e.g. half-sphere above the parking floor 102) is partitioned based on solid angles corresponding to different projector 101 pixels. The light signal of each projector pixel is modulated with a unique digital code and, in one embodiment, the aforesaid system 100 may use a two-dimensional reflected binary code (RBC) also called a gray code, well known to persons of ordinary skill in the art. In such a code, two successive values differ in only one bit (binary digit), which facilitates error correction in digital communications. The projector light modulation may be performed using a sequence of light pulses with each projector pixel being assigned a unique temporal light pulse sequence. When the aforesaid sequence of light pulses is detected using a luminosity sensor, well known to persons of ordinary skill in the art, a processing unit may be programmed to decode the received unique digital code and, consequently, uniquely identify the corresponding projector pixel, which would provide information on angular position of the aforesaid light sensor with respect to the projector.

Figure 2A:
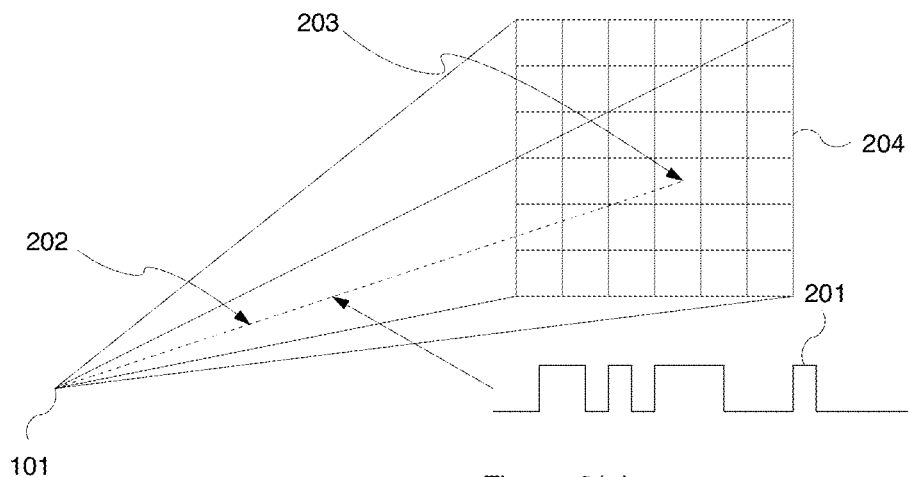
FIGS. 2(a) and 2(b) illustrate two temporal coded light signals produced by the projector.
Figure 2B:
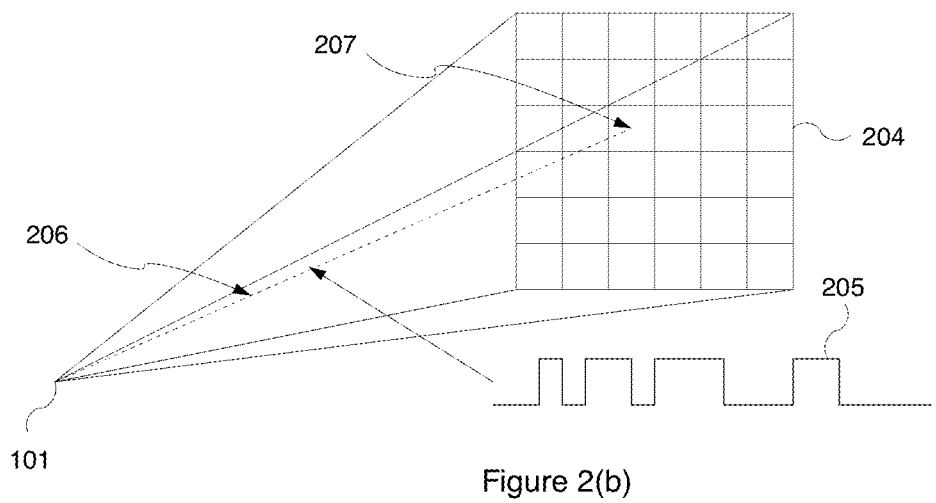

FIGS. 2(a) and 2(b) illustrate two temporal coded light signals 201 and 205 produced by the projector 101. In one embodiment, the projector 101 is a DLP projector, well known to persons of ordinary skill in the art. The temporal light signals 201 and 205 correspond to two different pixels 203 and 207 of the projector 101. The temporal light signal 201 propagating in the direction 202 is encoded with unique position information of the first projector pixel 203 using a corresponding first unique sequence of temporal light pulses. On the other hand, the temporal light signal 205 propagating in the direction 206 is encoded with unique position information of the second projector pixel 207 using a corresponding second unique sequence of temporal light pulses. In FIGS. 2(a) and 2(b) the projector pixels 203 and 207 are illustrated by their corresponding projections and on an imaginary projection surface 204. The aforesaid first and second sequences of light pulses are different and carry information about the respective projector pixel.

In one or more embodiments, two light sensors 104 and 105 are installed at the bottom of an aerial drone 106, as shown in FIG. 1. In various embodiments, the aerial drone 106 may be a multi-copter, such as quad-copter shown in FIG. 1. However, as would be appreciated by persons of ordinary skill in the art, other embodiments may use a different number or locations of light sensors. For example, there could be multiple light sensors, such as four, installed, for instance, on the four sides of the drone 106. Therefore, the any other suitable number and/or location of the light sensors may be used for detecting the coded light signal emitted by the projector 101 without departing from the scope and spirit of the concepts described herein. It should also be noted that while FIG. 1 illustrates receiving of the coded projector light by an aerial drone 106, the same concept may be applied to a self-driving car and/or other surface robot. Thus, the invention described herein is not limited to aerial drones and may be used for docking or otherwise guiding any other type of moving object. An exemplary embodiment involving a surface robot will be described in detail below.

In various embodiments, the light sensors 104 and 105 may be luminosity sensors, such as photodiodes or phototransistors, which are well known to persons of ordinary skill in the art. It should also be noted that the exact design of the light sensors 104 and 105 is not critical to the inventive concepts described herein and any now known or later developed light sensor may be used for detecting coded light from the projector 101. In one or more embodiments, these two light sensors 104 and 105 are configured to receive digital code modulated light sent by the projector 101 when there is no obstacle between the light source of the projector 101 and the drone light sensors 104 and 105. In other words, the light sensors 104 and 105 are configured to detect light pulses corresponding to specific projector 101 pixel or pixels. On the other hand, the drone's, car's or robot's onboard computer may use the output of the light sensors 104 and 105 to decode corresponding projector pixel codes and determine the precise location of the drone, car or robot in relation to the projector 101.

As would be appreciated by persons of ordinary skill in the art, because each pixel of the light signal emitted by the projector 101 is modulated with a fixed and unique sequential (temporal) code, the onboard computer of the drone 106 is able to determine its angular location relative to the projector 101 when it receives a code from one of its light sensors 104 or 105. In addition, because the correspondences between the code embedded in the projector light and solid angles are predefined, the onboard computer of the drone 106 can use the received code to easily determine drone's, car's or robot's direction (heading) toward the projector 101 and adjust drone's propellers, or car's or robot's drivetrain to move toward the projector 101 directly. Based on the received code, the onboard computer of the drone 106 can also determine codes in nearby spatial regions corresponding to neighboring projector pixels, through the predefined projection pattern.

In one or more embodiments, during the flying (or driving) process to the light source (projector) 101, the drone 106 is configured to frequently check the projector light code it receives using the light sensors 104 and 105. In addition, the drone 106 may be configured to measure the angular error between its current angle and the original angle it detected and use a proportional-integral-derivative (PID) landing control system, well known to persons of ordinary skill in the art, to adjust its flying (driving) path to the base. In this way, the drone 106 can follow a light ray to its base when it decides to go back for charging. As would be appreciated by persons of ordinary skill in the art, in case of an aerial drone guidance system, this approach can eliminate planning ambiguities in the sky.

Because the distance between the two light sensors 104 and 105 of the drone 106 is fixed and known, assuming the base surface is parallel to the parking surface 102, the distance from the drone 106 to the base can be calculated when the drone, car or robot gets closer to the base. When the two light sensors 104 and 105 receive different codes from two different projector pixels, the angle between these two sensors 104 and 105 can be estimated. Assuming the angle between the drone-to-base line and the ground 102 is θ, distance between two light sensors 104 and 105 on the drone 106 is y, the distance between the projection pixels in the projector is x (this can be determined with two received codes), and the distance between the projection surface and the lens is d, then the distance D from the drone 106 to the base can be calculated using the following equation:

$$D=(y*d)/(x*\sin\theta)$$

In one embodiment, this distance is used as an error input for the aforesaid PID landing control system of the drone 106. With the aforesaid error decreasing gradually, the onboard computer of the drone 106 can be programmed to reduce drone's 106 landing speed gradually for a smooth landing. To this end, the onboard computer of the drone 106 may be programmed with a number of distance thresholds and compare the determined distance to the base with the aforesaid thresholds. When the distance falls below a threshold, the speed is appropriately reduced.

Figure 3:
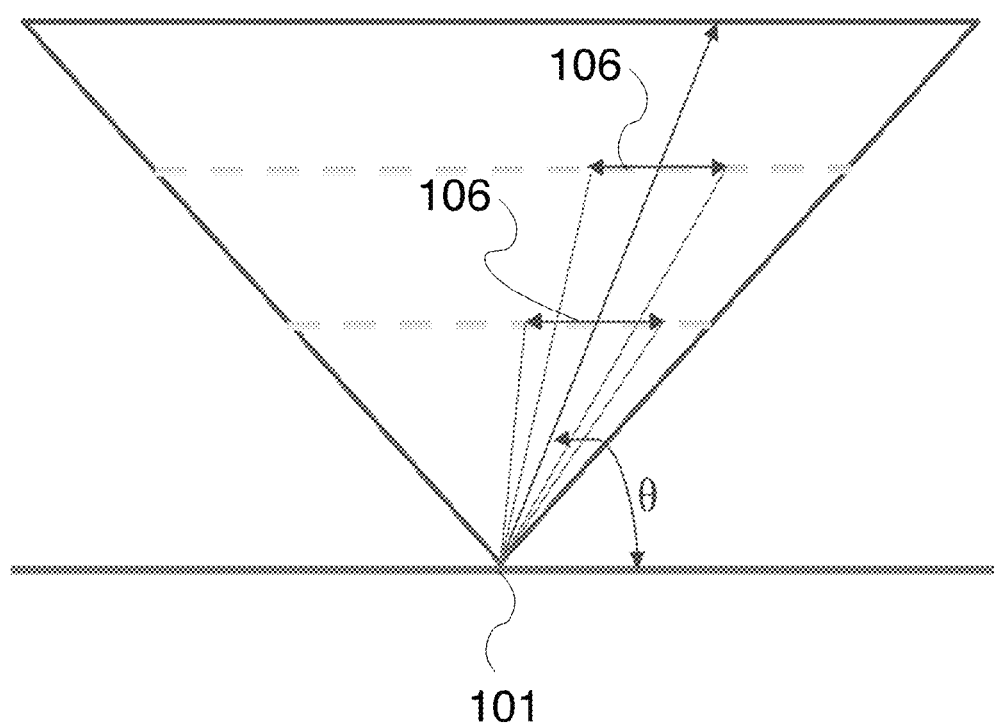
FIG. 3 illustrates that, when the drone gets closer to the base, the onboard computer of the drone is able to detect bigger x, and, therefore, can get a better resolution for determining the value of the distance to the base.

With reference to FIG. 3, when the drone 106 gets closer to the base, the onboard computer of the drone 106 is able to detect bigger x, and therefore can get a better resolution for determining the value of the distance D. As would be appreciated by persons of ordinary skill in the art, this feature is very helpful for smooth and accurate landing of the drone 106.

Figure 4:
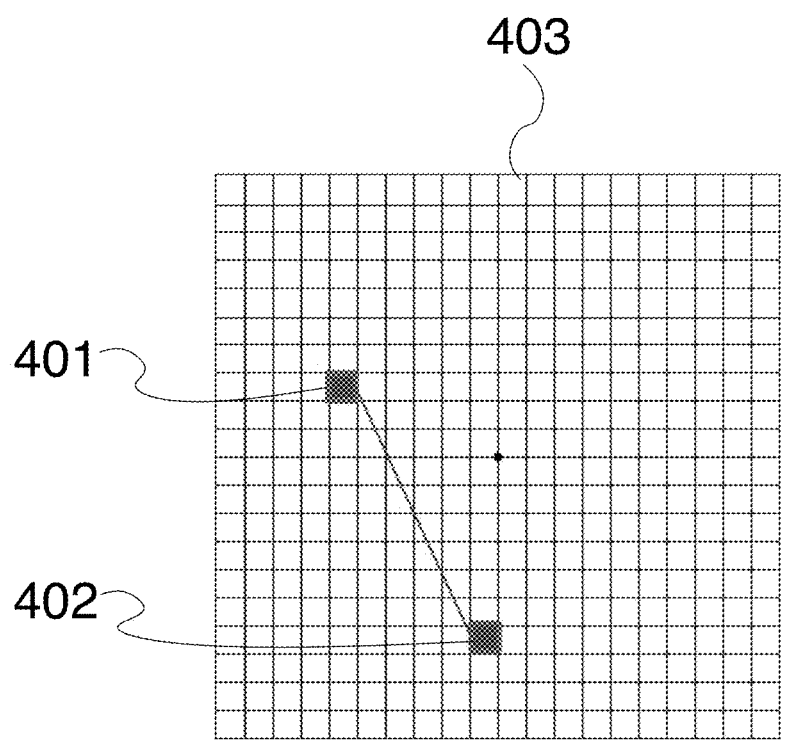
FIG. 4 illustrates two projector pixels on a projection plane.
Figure 5:
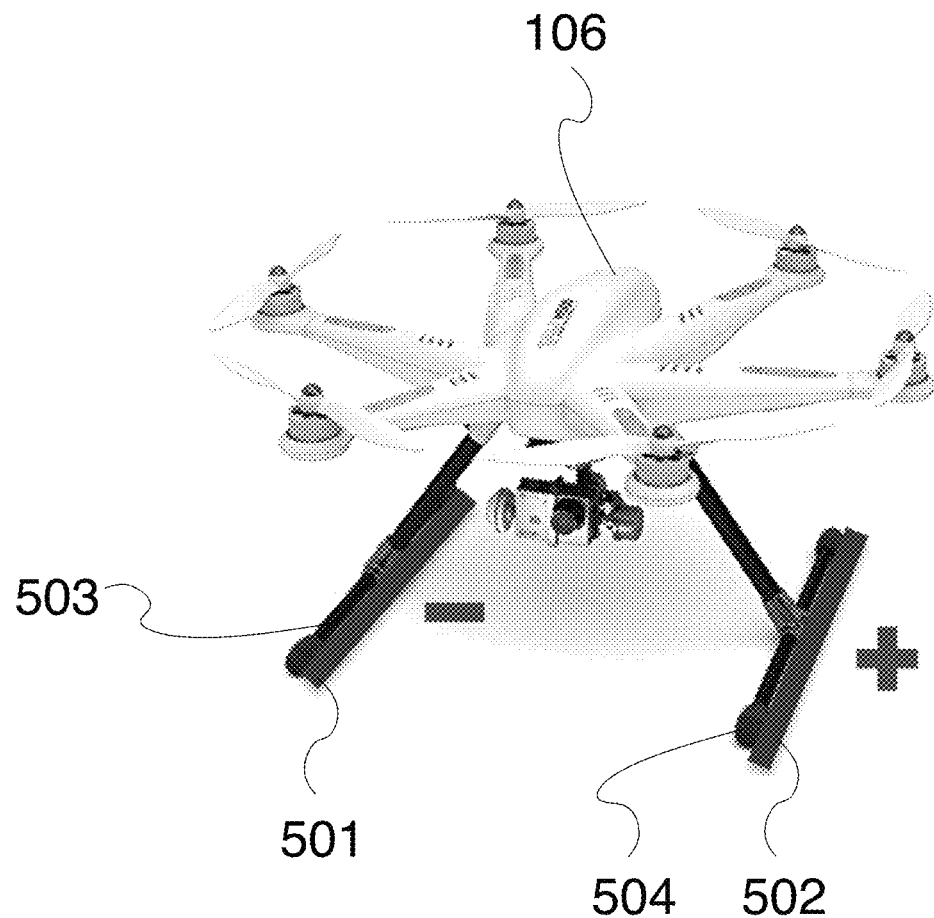
FIG. 5 illustrates orientation estimation procedure for an aerial drone.

In addition to measuring distance to the base, two light sensors 104 and 105 on the drone 106 also provide information on the drone's 106 orientation when the drone's base surface is substantially parallel to the ground. More specifically, the drone's 106 onboard computer may use two received codes from two light sensors 104 and 105 to determine their corresponding pixels on the projection plane. FIG. 4 is used to illustrate two pixels 401 and 402 on a projection plane 403. These two pixels 401 and 402 on the projection plane 403 may be used to estimate orientation of the drone 106 and this orientation may be compared with the orientation of the electrical charging contacts disposed at the drone's base. When the drone 106 gets closer to the base, the two pixels sending codes to the drone 106 will have a longer distance. That can help in more accurate estimation of the orientation of the drone 106. This orientation estimation is then compared with an orientation of electrical charging contacts 501 and 502 as shown in the FIG. 5. Similar to the landing control system, the aforesaid orientation error may be feed into a PID control system configured for the drone 106 to accurately align its feet 503 and 504 with electrical charging contacts 501 and 502, see FIG. 5. After the drone 106 lands its feet 503 and 504 on those charging contacts 501 and 502, the system can charge the drone's 106 battery through wires located inside the feet 503 and 504.

Hereinabove, it was explained how to a light projector 101 disposed at the base and two light sensors 104 and 105 mounted on the drone 106 may be used to guide drone 106 landing through a light ray. It was also explained how to estimate the distance between the drone 106 and the base and use that measurement to adjust drone speed for a smooth landing. Additionally, it was explained how to use two light sensors 104 and 105 to estimate drone orientation and use orientation error and PID control to land drone's conductive feet on electrical charging contacts for recharging the drone 106. With those procedures in mind, another embodiment of the invention will be described, which involves using coded light to guide a surface robot's or self-driving car docking process.

Figure 6:
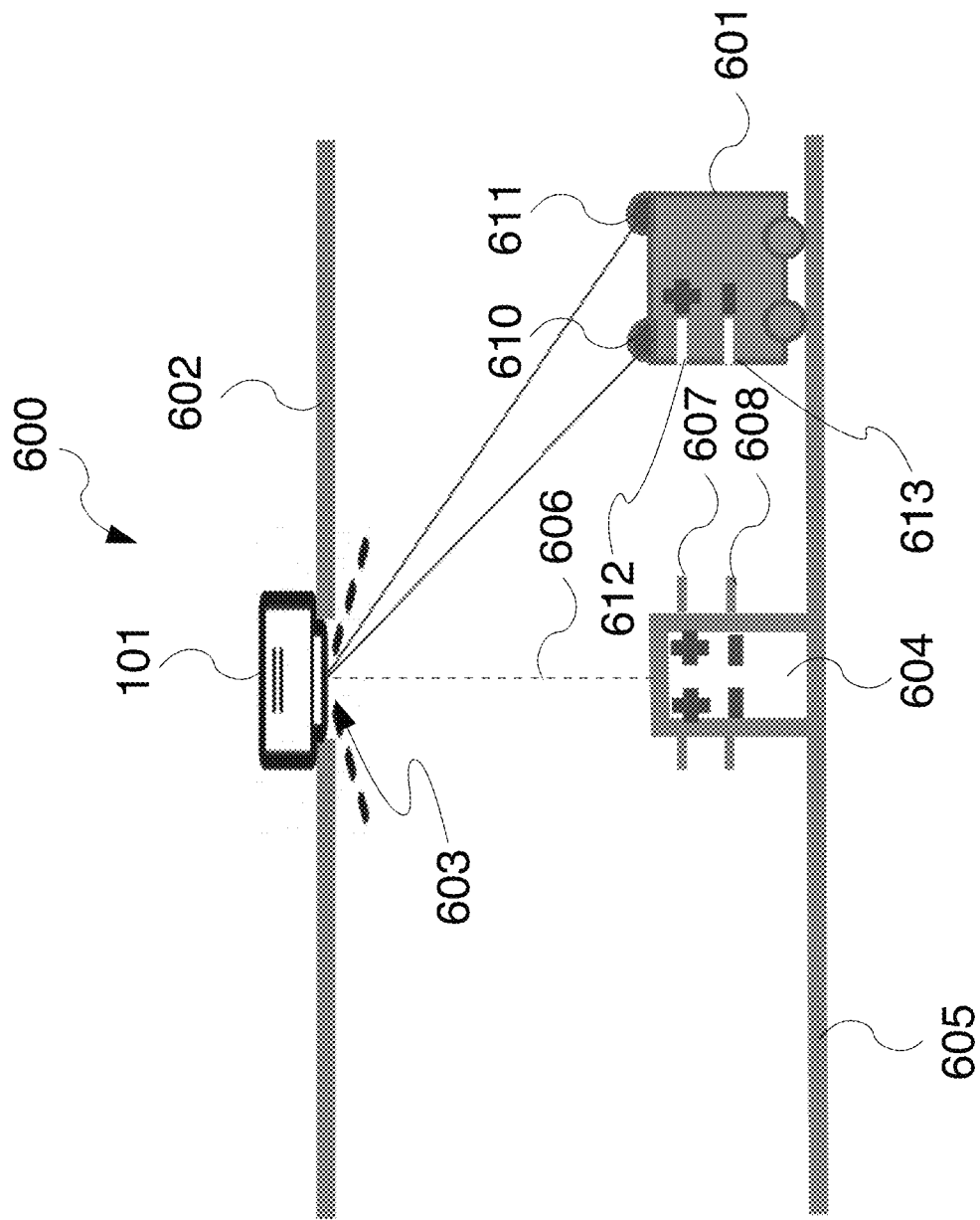
FIG. 6 illustrates an exemplary embodiment of a system for guiding a surface robot or a self-driving car to a recharging station.

FIG. 6 illustrates an exemplary embodiment of a system 600 for guiding a surface robot or a self-driving car 601 to a recharging station 604. In the system 600, a projector 101 is positioned on or above a ceiling 602. For example, in one embodiment, the projector 101 may be disposed to project coded light downwards through a hole 603 on the ceiling 602. In the embodiment shown in FIG. 6, directly under the projector 101, there is positioned a right cylindrical charging station 604 on the floor 605 and the station's cylinder axis 606 aligns with the projector's 101 optical axis. Outside of the charging station 604, there are two protruding disc contacts 607 and 608, for charging the robot or car 601. In one embodiment, the robot or self-driving car 601 has two light sensors 610 and 611 on its top surface with one sensor 610 being near the front and another sensor 611 is near the back of the robot or car 601. In one embodiment, the robot or car 601 also has two depressed contacts 612 and 613 disposed at substantially the same height from the floor 602 as the corresponding protruding disc contacts 607 and 608 of the charging station 604, see FIG. 6. When the robot or self-driving car 601 reaches the charging station 604, the depressed contacts 612 and 613 of the robot or car 601 mate with the corresponding protruding disc contacts 607 and 608 of the charging station 604. As would be appreciated by persons of ordinary skill in the art, many other charging contact configurations for the robot or self-driving car 601 and the charging station 604 are possible, and, therefore, the embodiments of the invention are not limited to any specific charging contact configuration or configurations.

Figure 7:
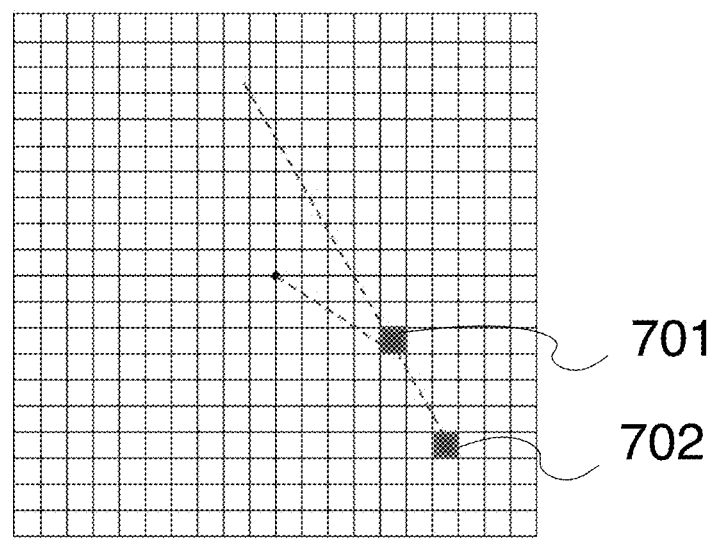
FIG. 7 illustrates the front light sensor and rear light sensor of a surface robot receiving two different light codes corresponding to two different projector pixels.

With reference to the system 600 shown in FIG. 6, when the robot or car 601 moves within the light projection region (e.g. within the field of view) of the projector 101, its front light sensor 610 and rear light sensor 611 will receive two different light codes corresponding to projector 101 pixels 701 and 702, as shown in FIG. 7. On the basis of these two received light codes, the onboard computer of the robot or car 601 can calculate the robot's heading direction, the charging station 604 direction, and distance from the robot 601 to the charging station 604. By adjusting the heading direction toward the charging station 604, through the PID control described above, the robot 601 can smoothly guide its front toward the charging station 604. In addition, using the information on the distance between the robot or car 601 front and the charging station 604, the robot or car 601 can dynamically adjust (gradually decrease) its moving speed toward the charging station 604, as the robot or car 601 gets closer thereto, such that the contact with the charging station 604 can be as smooth as possible.

Figure 8:
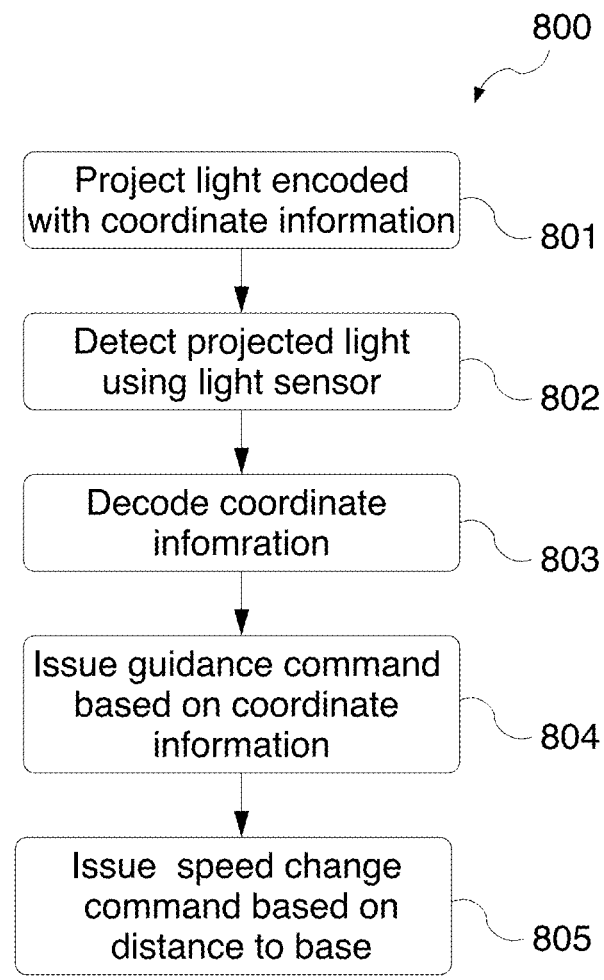
FIG. 8 illustrates an exemplary embodiment of an operating sequence of a process for landing or docking of an autonomous vehicle at its base, such as aerial drone, self-driving car or surface robot using coded lighting.

FIG. 8 illustrates an exemplary embodiment of an operating sequence 800 of a process for landing or docking of an autonomous vehicle at its base, such as aerial drone, self-driving car or surface robot using coded lighting. At step 801, a projector is used to project a temporal projector light signal, encoded, for each pixel of the projector, with an information segment comprising the pixel coordinates of the each pixel of the projector. At step 802, the projected light signal is detected using one or more light sensors of the autonomous vehicle that is being guided. At step 803, the on-board computer of the autonomous vehicle decodes the detected projected light signal and determines the position of the autonomous vehicle with respect to its base. At step 804, the on-board computer of the autonomous vehicle issues a command to the flight control system of drivetrain of the autonomous vehicle based on the determined position of the autonomous vehicle with respect to its base. Such command may be used to correct the trajectory of the autonomous vehicle. If the autonomous vehicle is within a predetermined distance from the base, then at step 805, on-board computer of the autonomous vehicle may issue a command to slow down the speed of the autonomous vehicle for smooth docking. The above process is thereafter repeated until docking takes place.

Exemplary Embodiments of Onboard Computer System

Figure 9:
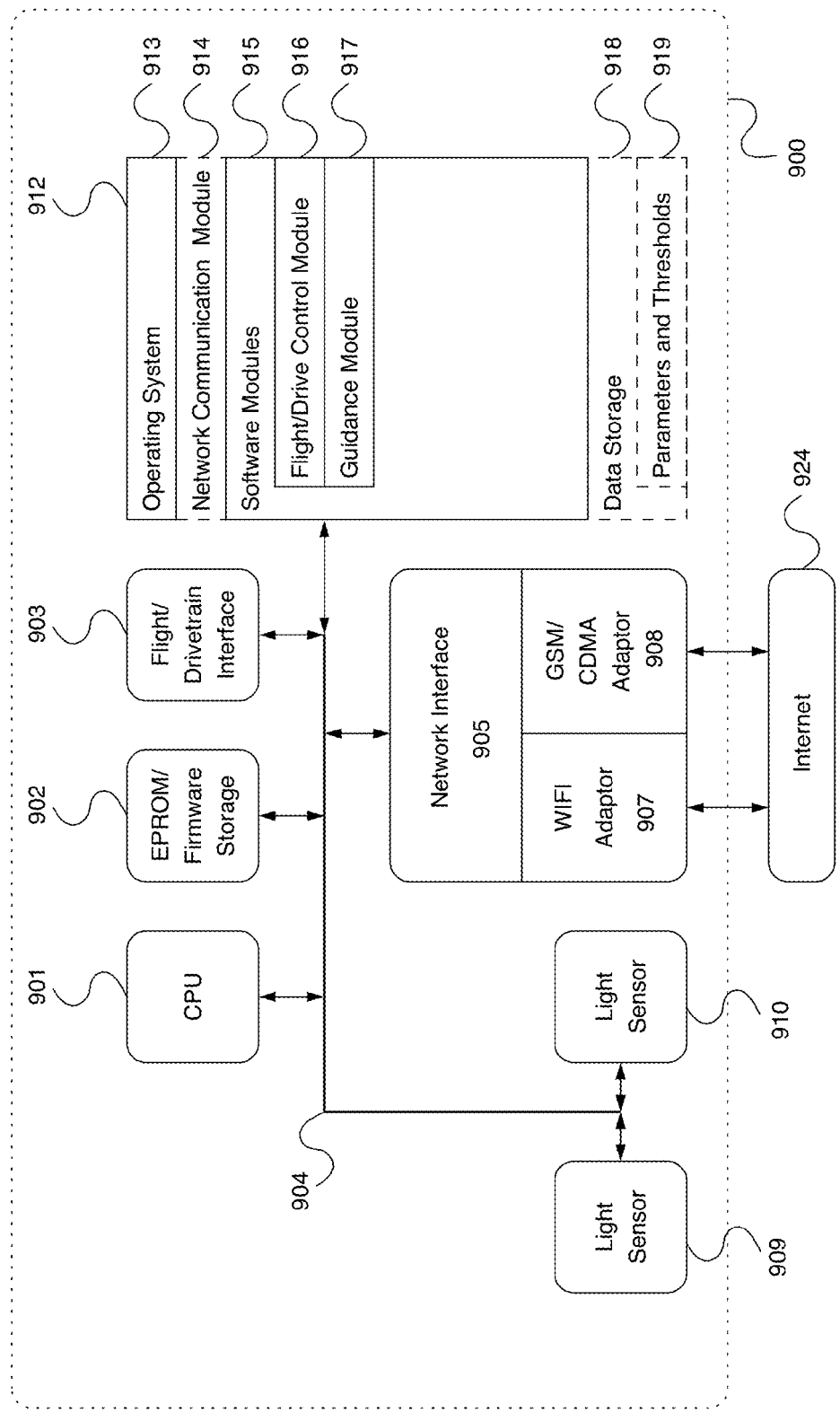
FIG. 9 illustrates an exemplary embodiment of an onboard computer of an autonomous vehicle, which may be used to implement the guiding techniques described herein.

FIG. 9 illustrates an exemplary embodiment of an onboard computer 900 of an autonomous vehicle, which may be used to implement the guiding techniques described herein. In one or more embodiments, the onboard computer 900 may be implemented within the form factor of a mobile computing device well known to persons of skill in the art. In an alternative embodiment, the onboard computer 900 may be implemented based on a laptop or a notebook computer. Yet in an alternative embodiment, the onboard computer 900 may be a specialized computing system, especially designed for the drone, robot or car.

The onboard computer 900 may include a data bus 904 or other interconnect or communication mechanism for communicating information across and among various hardware components of the onboard computer 900, and a central processing unit (CPU or simply processor) 901 coupled with the data bus 904 for processing information and performing other computational and control tasks. The onboard computer 900 also includes a memory 912, such as a random access memory (RAM) or other dynamic storage device, coupled to the data bus 904 for storing various information as well as instructions to be executed by the processor 901. The memory 912 may also include persistent storage devices, such as a magnetic disk, optical disk, solid-state flash memory device or other non-volatile solid-state storage devices.

In one or more embodiments, the memory 912 may also be used for storing temporary variables or other intermediate information during execution of instructions by the processor 901. Optionally, onboard computer 900 may further include a read only memory (ROM or EPROM) 902 or other static storage device coupled to the data bus 904 for storing static information and instructions for the processor 901, such as firmware necessary for the operation of the onboard computer 900, basic input-output system (BIOS), as well as various configuration parameters of the onboard computer 900.

In one or more embodiments, the onboard computer 900 may additionally incorporate two luminosity sensors 909 and 910 for detecting the coded light signal generated by the projector 101. In one embodiment, the luminosity sensors 909 and 910 have a fast response time to provide for high frequency position detection. In addition, the onboard computer 900 may incorporate a drivetrain or flight control interface 903 for controlling propellers of an aerial drone or drivetrain of surface robot or a self-driving car.

In one or more embodiments, the onboard computer 900 may additionally include a communication interface, such as a network interface 905 coupled to the data bus 904. The network interface 905 may be configured to establish a connection between the onboard computer 900 and the Internet 924 using at least one of WIFI interface 907 and the cellular network (GSM or CDMA) adaptor 908. The network interface 905 may be configured to provide a two-way data communication between the onboard computer 900 and the Internet 924. The WIFI interface 907 may operate in compliance with 802.11a, 802.11b, 802.11g and/or 802.11n protocols as well as Bluetooth protocol well known to persons of ordinary skill in the art. In an exemplary implementation, the WIFI interface 907 and the cellular network (GSM or CDMA) adaptor 908 send and receive electrical or electromagnetic signals that carry digital data streams representing various types of information.

In one or more embodiments, the Internet 924 typically provides data communication through one or more sub-networks to other network resources. Thus, the onboard computer 900 is capable of accessing a variety of network resources located anywhere on the Internet 924, such as remote media servers, web servers, other content servers as well as other network data storage resources. In one or more embodiments, the onboard computer 900 is configured send and receive messages, media and other data, including application program code, through a variety of network(s) including Internet 924 by means of the network interface 905. In the Internet example, when the onboard computer 900 acts as a network client, it may request code or data for an application program executing in the onboard computer 900. Similarly, it may send various data or computer code to other network resources.

In one or more embodiments, the functionality described herein is implemented by onboard computer 900 in response to processor 901 executing one or more sequences of one or more instructions contained in the memory 912. Such instructions may be read into the memory 912 from another computer-readable medium. Execution of the sequences of instructions contained in the memory 912 causes the processor 901 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 901 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 901 for execution. For example, the instructions may initially be carried on a magnetic disk from a remote computer. Alternatively, a remote computer can load the instructions into its dynamic memory and send the instructions over the Internet 924. Specifically, the computer instructions may be downloaded into the memory 912 of the onboard computer 900 from the foresaid remote computer via the Internet 924 using a variety of network data communication protocols well known in the art.

In one or more embodiments, the memory 912 of the onboard computer 900 may store any of the following software programs, applications and/or modules:

1. Operating system (OS) 913, which may be a mobile operating system for implementing basic system services and managing various hardware components of the onboard computer 900. Exemplary embodiments of the operating system 913 are well known to persons of skill in the art, and may include any now known or later developed mobile operating systems. Additionally provided may be a network communication module 914 for enabling network communications using the network interface 905.

2. Software modules 915 may include, for example, a set of software modules executed by the processor 901 of the onboard computer 900, which cause the onboard computer 900 to perform certain predetermined functions, such as issue commands to the drivetrain or flight control of the robot, car or drone for docking or landing at the base, see, for example, a flight/drive control module 916 and a docking guidance module 917.

3. Data storage 918 may be used, for example, for storing various parameters, such as various parameters of the projector 101, which are necessary for making calculations described above, see parameter and threshold store 919. In addition, the data storage 918 may store the aforesaid plurality of distance thresholds for gradually reducing the speed of the drone upon docking, see parameter and threshold store 919.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods employing coded light to land or dock autonomous vehicles, such as aerial drones, self-driving cars and surface robots. It is intended that the specification and examples be considered as exemplary only, with a true scope and spirit of the invention being indicated by the following claims.

What is claimed is:

1. An autonomous vehicle guidance system comprising:
   a. a projector configured to project a temporal projector light signal, wherein the temporal projector light signal is encoded, for each pixel of the projector, with an information segment comprising the pixel coordinates of the each pixel of the projector; and
   b. an autonomous vehicle comprising a light sensor and an onboard computer operatively coupled to the light sensor, wherein the light sensor is configured to detect the temporal projector light signal and generate a sensor signal and wherein the onboard computer is configured to receive the sensor signal from the light sensor, to determine a location information of the autonomous vehicle based on the detected temporal projector light signal and to issue a guidance command to guide the autonomous vehicle to a base based on the detected temporal projector light signal, wherein the autonomous vehicle further comprises a second light sensor configured to detect the temporal projector light signal and generate a second sensor signal, and wherein a distance from the autonomous vehicle to the base is determined from the respective sensor signals.

2. The autonomous vehicle guidance system of claim 1, wherein the onboard computer of the autonomous vehicle determines the location information of the autonomous vehicle by identifying a projector pixel corresponding to the sensor signal.

3. The autonomous vehicle guidance system of claim 2, wherein the location information of the autonomous vehicle comprises angular position of the autonomous vehicle with respect to the projector.

4. The autonomous vehicle guidance system of claim 2, wherein the onboard computer of the autonomous vehicle determines the location information of the autonomous vehicle by identifying a second projector pixel corresponding to the second sensor signal and wherein the location information further comprises a distance from the autonomous vehicle to the projector.

5. The autonomous vehicle guidance system of claim 4, wherein the distance from the autonomous vehicle to the projector is additionally determined based on a distance between the light sensor and the second light sensor.

6. The autonomous vehicle guidance system of claim 4, wherein the onboard computer of the autonomous vehicle is configured to cause the autonomous vehicle to slow down when the determined distance from the autonomous vehicle to the projector is less than a predetermined threshold.

7. The autonomous vehicle guidance system of claim 1, wherein the onboard computer of the autonomous vehicle determines orientation information of the autonomous vehicle by identifying a projector pixel corresponding to the sensor signal and a second projector pixel corresponding to the second sensor signal and wherein the orientation information is determined based on the identified first projector pixel and the second projector pixel.

8. The autonomous vehicle guidance system of claim 7, wherein the onboard computer of the autonomous vehicle is configured to issue a second command to cause the autonomous vehicle to achieve a predetermined orientation.

9. The autonomous vehicle guidance system of claim 8, wherein the autonomous vehicle comprises a plurality of electrical contacts and wherein when the autonomous vehicle achieves the predetermined orientation, the plurality of electrical contacts of the autonomous vehicle mates with a second plurality of electrical contacts of a base to enable charging of the autonomous vehicle.

10. The autonomous vehicle guidance system of claim 1, wherein the temporal projector light signal projected by the project comprises a plurality of sequential light pulses encoding pixel coordinates of the each pixel of the projector.

11. The autonomous vehicle guidance system of claim 1, wherein the onboard computer is configured to issue the guidance command based on a difference between the sensor signal and the second sensor signal.

12. The autonomous vehicle guidance system of claim 11, wherein the guidance command is issued based on proportional-integral-derivative (PID) calculation.

13. The autonomous vehicle guidance system of claim 1, wherein the autonomous vehicle is an aerial drone, wherein the projector is positioned at a drone base, wherein the light sensor is positioned on the bottom side of the aerial drone and wherein the onboard computer issues the guidance command to guide the aerial drone to the drone base.

14. The autonomous vehicle guidance system of claim 1, wherein the autonomous vehicle is a surface robot, wherein the projector is positioned above a surface robot charging station, wherein the light sensor is positioned on the top front side of the robot and wherein the onboard computer issues the guidance docking command to guide the surface robot to the charging station.

15. The autonomous vehicle guidance system of claim 14, wherein the surface robot further comprises a second light sensor positioned on the top rear side of the robot.

16. The autonomous vehicle guidance system of claim 14, wherein the charging station comprises a first set of electrical contacts and the surface robot comprises a second set of electrical contacts designed to mate with the first set of electrical contacts when the surface robot dock at the charging station.

17. The autonomous vehicle guidance system of claim 14, wherein a central axis of the charging station coincides with a central axis of the projector.

18. The autonomous vehicle guidance system of claim 1, wherein the autonomous vehicle is a self-driving car.

19. The autonomous vehicle guidance system of claim 1, wherein the autonomous vehicle is an aerial drone, and wherein the guidance command directs the aerial drone to land.

20. A method for guiding an autonomous vehicle, the method comprising:
   a. using a projector to project a temporal projector light signal, wherein the temporal projector light signal is encoded, for each pixel of the projector, with an information segment comprising the pixel coordinates of the each pixel of the projector;
   b. detecting the temporal projector light signal using a light sensor of an autonomous vehicle and generating corresponding sensor signal;
   c. detecting the temporal projector light signal using a second light sensor of an autonomous vehicle and generating a corresponding second sensor signal; and
   d. using an onboard computer of the autonomous vehicle to receive the sensor signal, to determine location of the autonomous vehicle based on the detected temporal projector light signal and to issue a guidance command to guide the autonomous vehicle to a base based on the detected temporal projector light signal, wherein a distance from the autonomous vehicle to the base is determined from the respective sensor signals.

21. A non-transitory computer-readable medium embodying a set of instructions implementing a method for guiding an autonomous vehicle, the method comprising:
   a. using a projector to project a temporal projector light signal, wherein the temporal projector light signal is encoded, for each pixel of the projector, with an information segment comprising the pixel coordinates of the each pixel of the projector;
   b. detecting the temporal projector light signal using a light sensor of an autonomous vehicle and generating corresponding sensor signal;
   c. detecting the temporal projector light signal using a second light sensor of an autonomous vehicle and generating a corresponding second sensor signal; and
   d. using an onboard computer of the autonomous vehicle to receive the sensor signal, to determine location of the autonomous vehicle based on the detected temporal projector light signal and to issue a guidance command to guide the autonomous vehicle to a base based on the detected temporal projector light signal, wherein a distance from the autonomous vehicle to the base is determined from the respective sensor signals.

* * * * *